US011043046B2

(12) United States Patent
Jasper (10) Patent No.: US 11,043,046 B2
(45) Date of Patent: Jun. 22, 2021

(54) FAILURE DETECTION SYSTEM

(71) Applicant: Bell Helicopter Textron Inc., Fort Worth, TX (US)

(72) Inventor: Elizabeth Jasper, Houston, TX (US)

(73) Assignee: Textron Innovations Inc., Providence, RI (US)

( * ) Notice: Subject to any disclaimer, the term of this patent is extended or adjusted under 35 U.S.C. 154(b) by 215 days.

(21) Appl. No.: 15/916,182

(22) Filed: Mar. 8, 2018

(65) Prior Publication Data

US 2019/0279442 A1    Sep. 12, 2019

(51) Int. Cl.
| | |
|---|---|
| *G07C 5/08* | (2006.01) |
| *B64D 35/00* | (2006.01) |
| *F16H 57/01* | (2012.01) |
| *F16H 57/08* | (2006.01) |
| *G06T 7/00* | (2017.01) |
| *B64C 27/00* | (2006.01) |
| *F16H 1/28* | (2006.01) |
| *B64D 45/00* | (2006.01) |
| *F16H 61/12* | (2010.01) |

(52) U.S. Cl.
CPC .......... *G07C 5/0808* (2013.01); *B64C 27/006* (2013.01); *B64D 35/00* (2013.01); *F16H 57/01* (2013.01); *F16H 57/082* (2013.01); *G06T 7/001* (2013.01); *B64D 2045/0085* (2013.01); *F16H 1/28* (2013.01); *F16H 2057/012* (2013.01); *F16H 2061/1208* (2013.01); *G06T 2207/30164* (2013.01)

(58) Field of Classification Search
CPC ....... G07C 5/0808; B64D 35/00; F16H 57/01; G06T 7/001
See application file for complete search history.

(56) References Cited

U.S. PATENT DOCUMENTS

| | | | | | |
|---|---|---|---|---|---|
| 5,905,923 | A | * | 5/1999 | Chitsaz | F16C 33/26 248/183.3 |
| 2005/0284225 | A1 | * | 12/2005 | Luo | F16H 57/01 73/593 |
| 2009/0071278 | A1 | | 3/2009 | Chiu et al. | |
| 2012/0025526 | A1 | | 2/2012 | Luo et al. | |
| 2012/0156034 | A1 | | 6/2012 | Sabannavar et al. | |
| 2015/0088435 | A1 | * | 3/2015 | Isom | G01M 13/021 702/35 |
| 2015/0116131 | A1 | | 4/2015 | Ikeda et al. | |

(Continued)

FOREIGN PATENT DOCUMENTS

| | | | |
|---|---|---|---|
| DE | 102008048956 A1 | 4/2010 | |
| DE | 102010026085 A1 * | 1/2012 | ............. F16H 57/01 |

(Continued)

OTHER PUBLICATIONS

European Exam Report in related European Patent Application No. 18171730.7 dated Oct. 4, 2019, 5 pages.

(Continued)

*Primary Examiner* — Thomas G Black
*Assistant Examiner* — Tarek Elarabi
(74) *Attorney, Agent, or Firm* — Lightfoot & Alford PLLC (57) ABSTRACT

A failure detection system (FDS) for a gearbox has a power source disposed within the gearbox, a camera element disposed within the gearbox, a processor disposed within the gearbox.

20 Claims, 11 Drawing Sheets

(56) References Cited

U.S. PATENT DOCUMENTS

| | | | |
|---|---|---|---|
| 2015/0192526 A1* | 7/2015 | Nissen | G01N 21/91 |
| | | | 348/92 |
| 2015/0193919 A1* | 7/2015 | Nissen | G06T 7/001 |
| | | | 348/92 |
| 2019/0074747 A1* | 3/2019 | Shukla | H02K 7/14 |
| 2019/0078975 A1* | 3/2019 | Sibbach | G01M 13/028 |

FOREIGN PATENT DOCUMENTS

| DE | 102010026085 A1 | 1/2012 |
|---|---|---|
| EP | 2559988 A2 | 2/2013 |

OTHER PUBLICATIONS

European Search Report in related European Patent Application No. 18171730.7 dated Sep. 3, 2018, 5 pages.
European Exam Report in related European Patent Application No. 18171730.7 dated Sep. 17, 2018, 7 pages.
European Exam Report in related European Patent Application No. 18171730.7 dated May 6, 2020, 8 pages.
European Exam Report in related European Patent Application No. 18171730.7 dated Nov. 20, 2020, 5 pages.

* cited by examiner

FAILURE DETECTION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Aircraft such as helicopters commonly comprise power trains, gear trains, planetary gearsets, and/or many other mechanical systems that utilize bearings. The bearings often comprise inner and outer races along which bearing elements roll. The races of bearings can be damaged by fatigue or by exposure to other solids being inadvertently being introduced between the bearing elements and the races of the bearings. Regardless the cause, damaged bearing races can sometimes pose potentially catastrophic failure of larger systems. Conventionally, bearing failure detection is attempted by using chip detectors that monitor for the existence of undesirable pieces of metal. However, chip detectors are not well-suited for providing confirmation as to whether a detected chip is associated with a failing bearing as opposed to any other source of a chip (such as a gear tooth or a machining chip). Accordingly, there is a need for detecting bearing failures as compared to simply indicating an existence of undesirable chip content.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
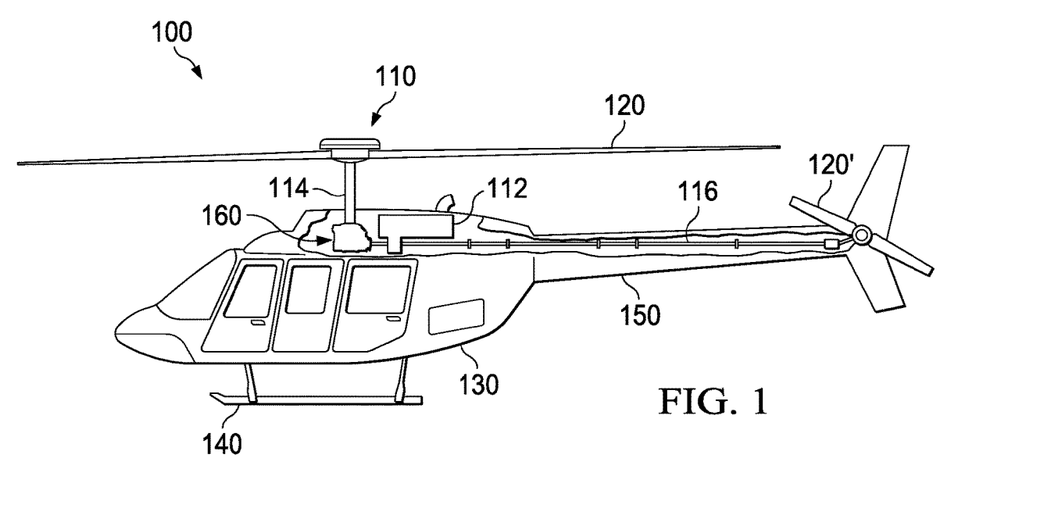
FIG. 1 shows a rotorcraft that comprises a failure detection system (FDS) of this disclosure.
Figure 2:
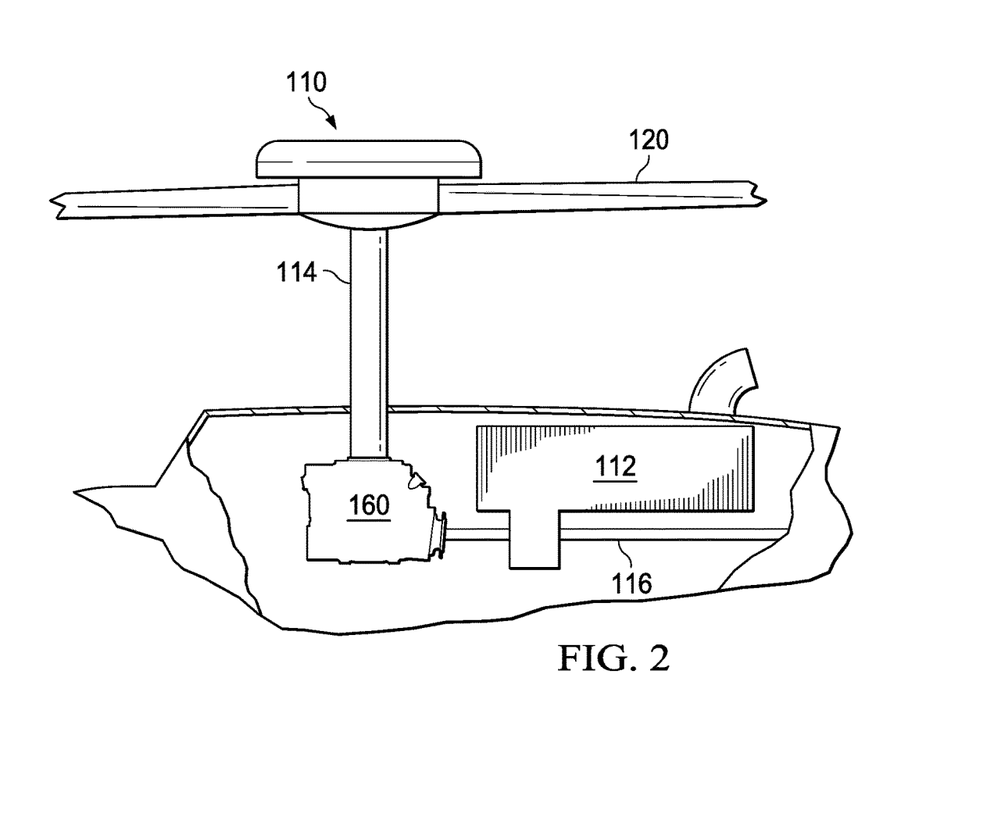
FIG. 2 shows a power train system of the rotorcraft of FIG. 1.

FIG. 1 shows a rotorcraft 100 according to one example embodiment. Rotorcraft 100 features power train system 110, main rotor blades 120, tail rotor blades 120', a fuselage 130, a landing gear 140, and an empennage 150. Power train system 110 may rotate blades 120 and/or blades 120'. FIG. 2 shows the power train system 110 of FIG. 1.

In the example of FIGS. 1 and 2, power train system 110 includes an engine 112, a gearbox 160, a rotor mast 114, and a tail rotor drive shaft 116. Engine 112 supplies torque to mast 114, via gearbox 160, for rotating of blades 120. Engine 112 also supplies torque to tail rotor drive shaft 116 for rotating blades 120'. In the examples of FIGS. 1 and 2, gearbox 160 is a main rotor transmission system. Teachings of certain embodiments recognize, however, that power train system 110 may include more or different gearboxes than gearbox 160 shown in FIG. 1. Power train system 110 may include a control system for selectively controlling the pitch of each blade 120 to selectively control direction, thrust, and lift of rotorcraft 100.

Fuselage 130 represents the body of rotorcraft 100 and may be coupled to power train system 110 such that power train system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features blades 120'. Power train system 110 and blades 120' may collectively provide thrust in the same direction as the rotation of blades 120 to counter the torque effect created by blades 120. It should be appreciated that teachings from rotorcraft 100 may apply to aircraft other than rotorcraft, such as airplanes, tilt rotors, and unmanned aircraft, to name a few examples. In addition, teachings of certain embodiments relating to rotor systems described herein may apply to power train system 110 and/or other power train systems, including but not limited to non-rotorcraft power train systems.

In the embodiment of FIGS. 1 and 2, gearbox 160 transmits power from a power source (e.g., engine 112) to an object or objects to be moved (e.g., blades 120). Gearbox 160 converts speed and torque between the power source and the object(s) to be moved. Gearbox 160 may be configured to reduce the speed of the rotational output of engine 112, while increasing the torque applied to blades 120.

Figure 3:
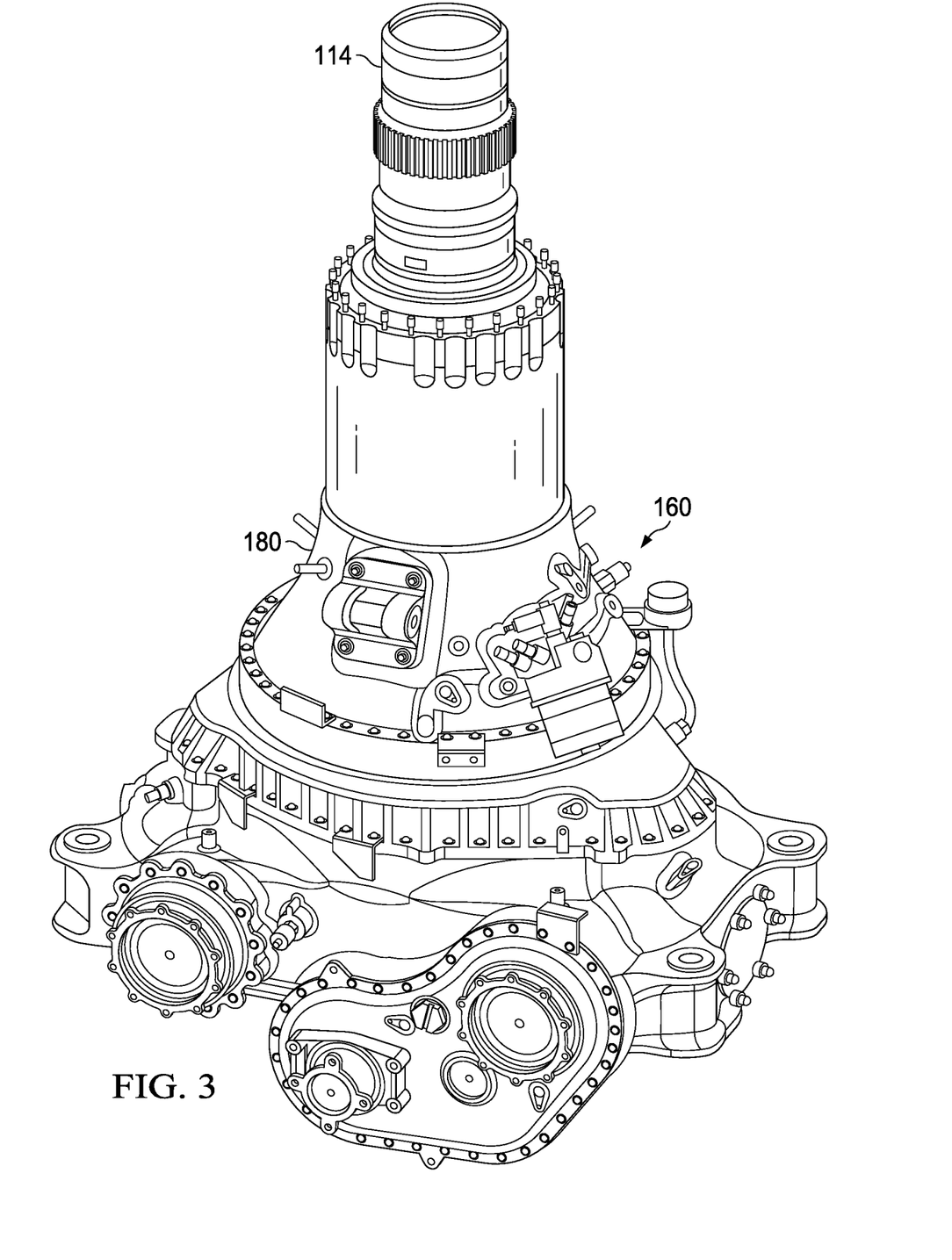
FIG. 3 shows an isometric view of a rotorcraft gearbox of the power train system of FIG. 2.

FIG. 3 shows a gearbox 160 according to one example embodiment. According to the embodiment of FIG. 3, gearbox 160 is a main rotor gearbox and includes a rotor mast 114. Gearbox 160 also includes at least one gearbox housing 180 and various gears contained therein (see FIGS. 4 and 5). A gear is a rotating part having teeth that mesh with another toothed part to transmit rotational energy. As one skilled in the art will readily appreciate, the gears within gearbox 160 accomplish speed and torque conversions that are desired for a given implementation. For instance, the gearbox 160 of FIG. 3 reduces rotational speed while multiplying the torque output, which is applied to blades 120 of rotorcraft 100.

Figure 4:
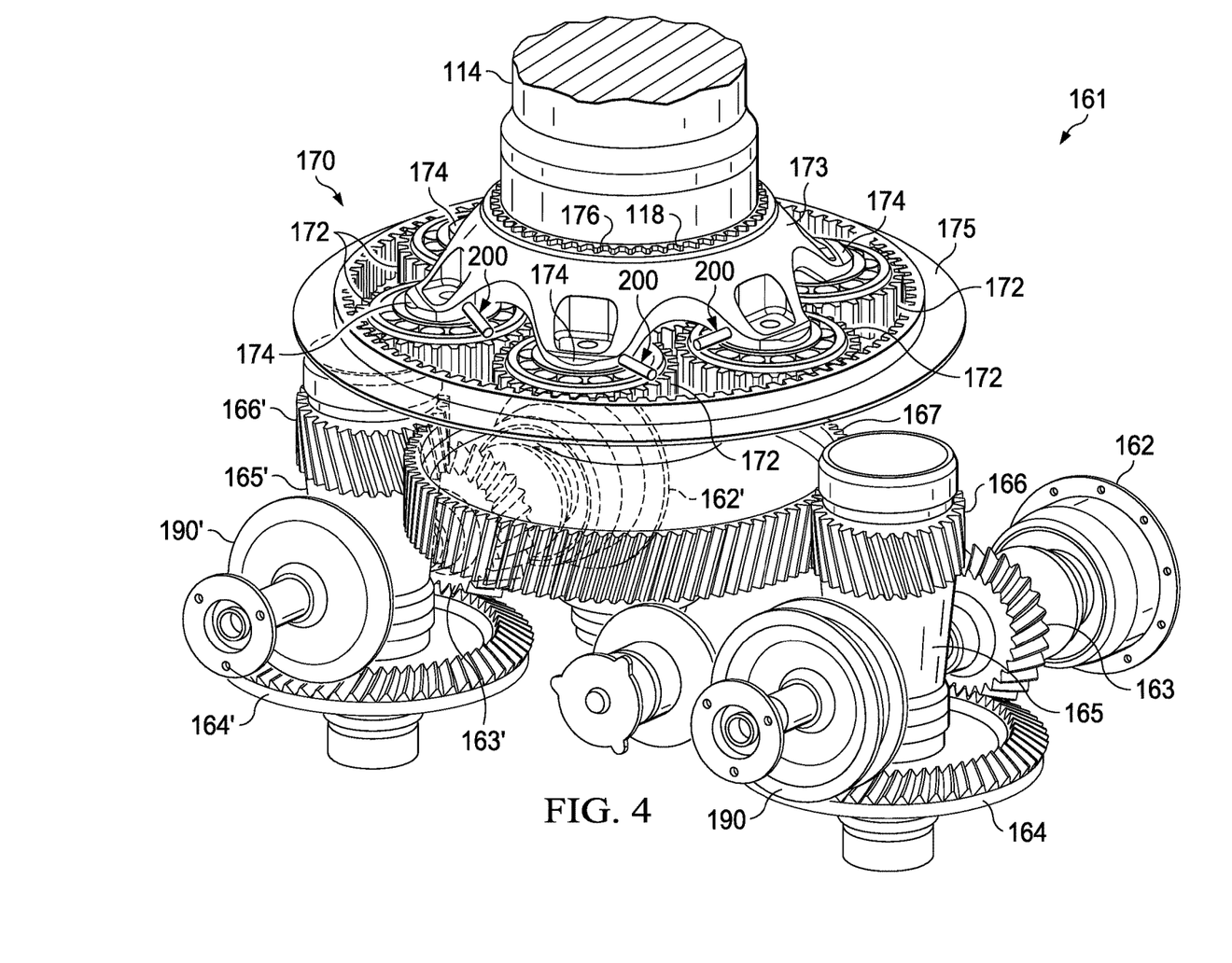
FIG. 4 shows a gear train of the rotorcraft gearbox of FIG. 3.
Figure 5:
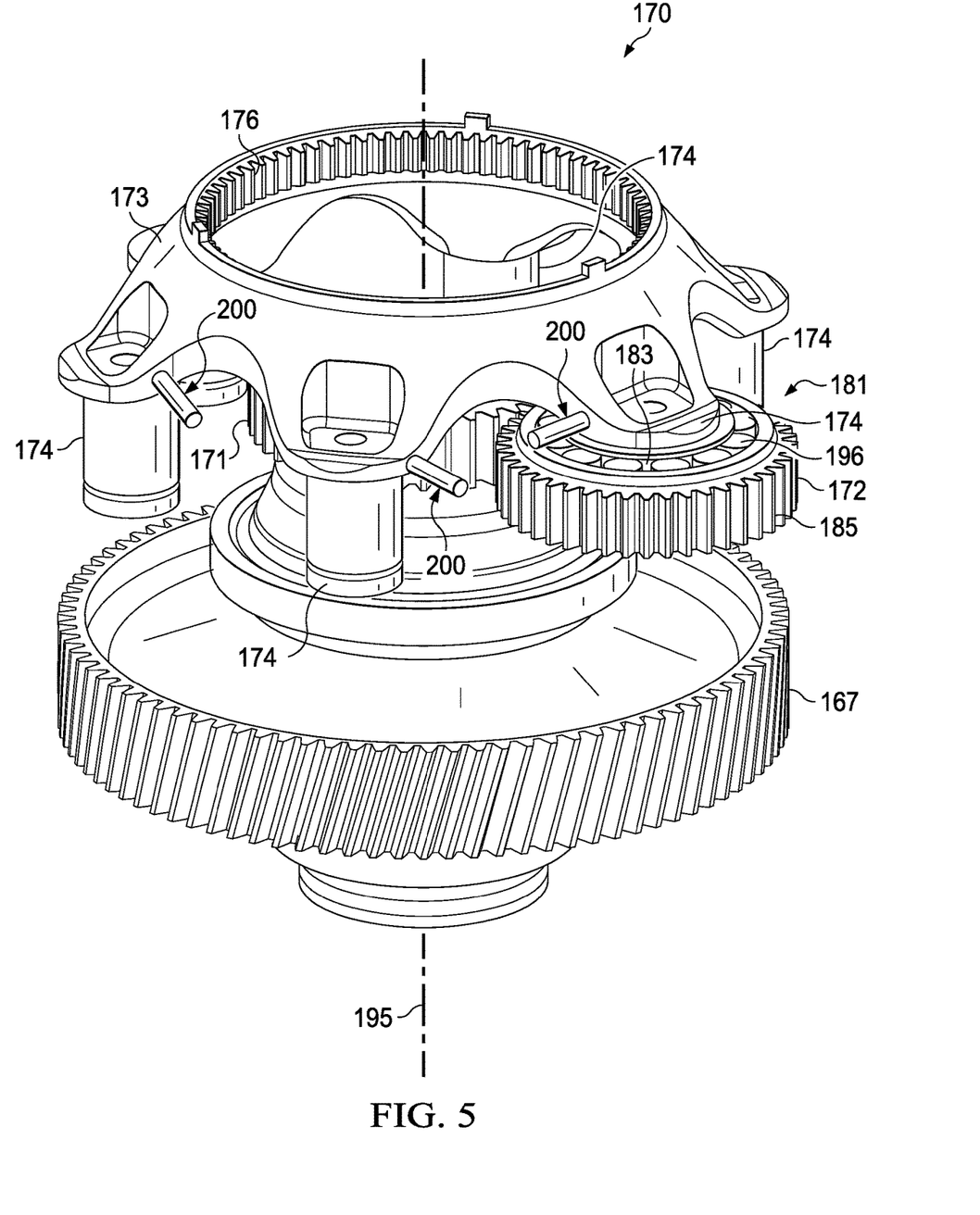
FIG. 5 shows a planetary gearset of the gear train of FIG. 4.

FIGS. 4 and 5 illustrate a gear train 161 contained within gearbox housing 180. Referring to the embodiment of FIG. 4, gear train 161 includes an input pinion 162. Input pinion 162 is in mechanical communication with, and receives rotational energy from, a power source (e.g., engine 112). Input pinion 162 includes a helical bevel gear portion 163. The helical bevel gear portion 163 of input pinion 162 meshes with, and transmits rotational energy to, bevel gear 164. Bevel gear 164 is a helical bevel gear. Bevel gear 164 meshes with and drives an accessory drive gear 190, which is configured to provide rotational energy to an accessory gearbox (not shown) and/or various aircraft accessories, such as air blowers, cooling fans, lubrication pumps, hydraulic pumps, electrical generators, and similar components and systems (not shown). Bevel gear 164 is attached via a common shaft 165 to helical spur gear 166. Thus, bevel gear 164, common shaft 165, and helical spur gear 166 rotate together about a common axis. Torque applied to bevel gear 164 is transmitted via common shaft 165 to helical spur gear 166. Helical spur gear 166 meshes with, and transmits rotational energy to, bull gear 167. Bull gear 167 is integral with sun gear 171 (see FIG. 5) of planetary gear set 170. Thus, torque applied to bull gear 167 is transmitted to sun gear 171.

The embodiment of FIG. 4 is configured to receive rotational energy from two power sources. Specifically, gear train 161 includes a second input pinion 162', which may be configured to receive rotational energy from a second power source (e.g., a second engine 112). Second input pinion 162' includes a helical bevel gear portion 163'. The helical bevel gear portion 163' of second input pinion 162' meshes with, and transmits rotational energy to, a second bevel gear 164'. Like bevel gear 164, second bevel gear 164' is a helical bevel gear. Second bevel gear 164' meshes with and drives a second accessory drive gear 190', which is configured to provide rotational energy to an accessory gearbox (not shown) and/or various aircraft accessories, such as air blowers, cooling fans, lubrication pumps, hydraulic pumps, electrical generators, and similar components and systems (not shown). Second bevel gear 164' is attached via a second common shaft 165' to a second helical spur gear 166'. Thus, second bevel gear 164', second common shaft 165', and second helical spur gear 166' rotate together about a common axis. Torque applied to second bevel gear 164' is transmitted via second common shaft 165' to second helical spur gear 166'. Second helical spur gear 166' meshes with, and transmits rotational energy to, bull gear 167, which is integral with sun gear 171 (see FIG. 5). Accordingly, rotational energy provided at either or both input pinions 162, 162' is ultimately combined at bull gear 167 and transmitted to sun gear 171.

FIG. 5 depicts the planetary gear set 170 within gear train 161. Specifically, sun gear 171 is a straight-cut spur gear that meshes with, and transmits rotational energy to, a plurality of planet gears 172. Planet gears 172 are rotatably mounted to a planetary carrier 173. The embodiment of FIG. 5 includes a total of six planet gears 172. According to the present embodiment, planetary carrier 173 includes a plurality of posts 174 configured to receive each of the plurality of planet gears 172. Each post 174, therefore, defines the rotational axis for a corresponding planet gear 172 rotatably mounted thereon. The planetary carrier 173 of FIGS. 4 and 5 is an overhung planetary carrier, having a plurality of downwardly-extending, cantilevered posts 174. However, one skilled in the art will appreciate that other configurations and orientations are possible for the planetary gear set 170, including the planetary carrier 173. For instance, in an alternative embodiment planetary carrier 173 might be a conventional planetary carrier, which one skilled in the art would appreciate as comprising a lower plate, an upper web, and planetary posts extending between the lower plate and upper web.

Referring to FIG. 4, each planet gear 172 also meshes with ring gear 175. Ring gear 175 is stationary. According to the present embodiment, ring gear 175 is fixedly mounted within gearbox housing 180 and does rotate with respect to the gearbox housing 180. Planetary carrier 173 establishes the spatial relationship among the sun gear 171, the planet gears 172, and the ring gear 175, such that each planet gear 172 meshes with both the sun gear 171 and the ring gear 175. Because the sun gear 171 rotates while the ring gear 175 is fixed, the planet gears 172 travel on an orbiting path about sun gear 171 as they rotate on posts 174. This orbiting action causes planetary carrier 173 to rotate.

According to the embodiment depicted in FIGS. 4 and 5, the planetary carrier 173 includes internal splines 176. Internal splines 176 mesh with mating external splines 118 on rotor mast 114 (see FIG. 4). Thus, planetary carrier 173 serves as the main output for gearbox 160 by transmitting rotational energy to rotor mast 114. In the embodiment of FIGS. 4 and 5, the bull gear 167, sun gear 171, planetary carrier 173, and rotor mast 114 all rotate about a substantially common axis of rotation 195 (see FIG. 5).

Figure 6:
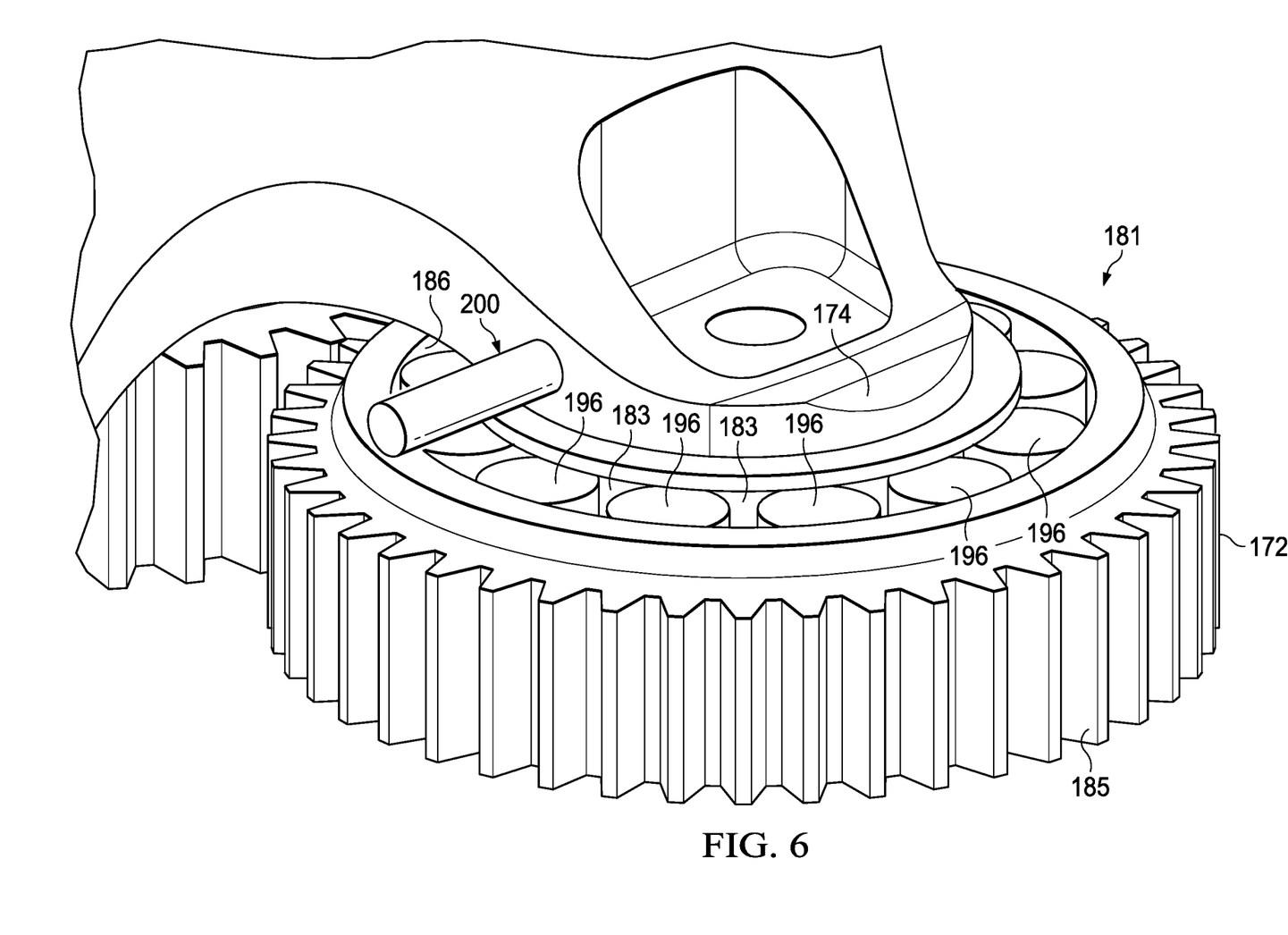
FIG. 6 show a closer view of a planetary gear of the planetary gearset of FIG. 5.
Figure 7:
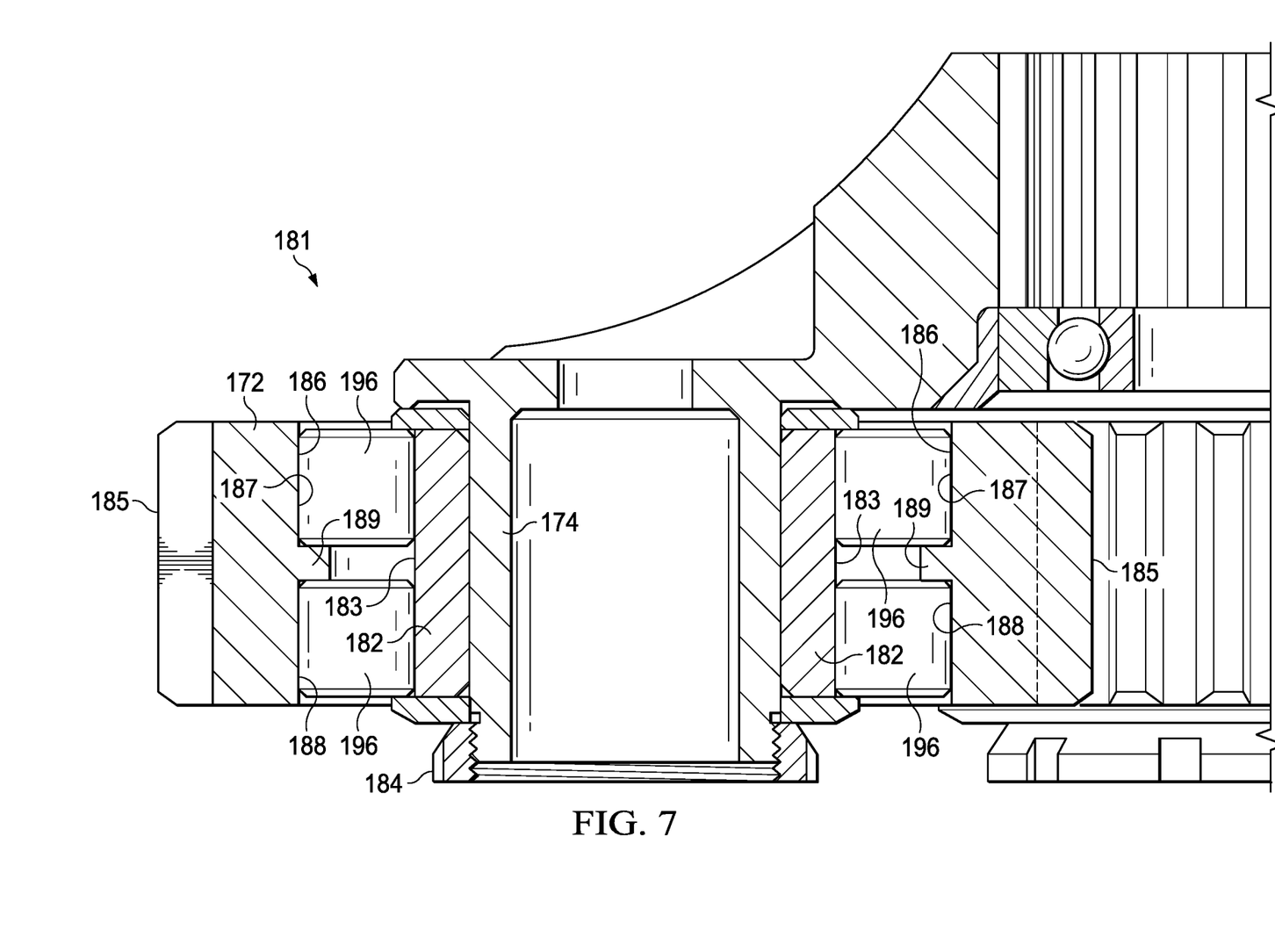
FIG. 7 shows a cross-sectional view of the planetary gear of FIG. 6 with an associated bearing system.

Referring now to FIGS. 5-7 each planet gear 172 forms a portion of a bearing system 181. In this embodiment, the bearing systems 181 comprise an inner race 182 which is coaxially received on a post 174 and which provides an inner race surface 183. The inner race 182 is secured in place relative to the post 174 using a retainer 184 which may be screwed onto the post 174 or attached using an interference fit. The planet gear 172 not only comprises teeth 185, but also comprises at least one outer race surface 186. In this embodiment, the outer race surface 186 is shown as comprising a first track 187 and a second track 188 separated from the first track 187 by a divider wall 189. Multiple roller bearings 196 are disposed between the inner race 182 and the planet gear 172 and the roller bearings are captured between the inner race surface 183 and the outer race surface 186.

Figure 8:
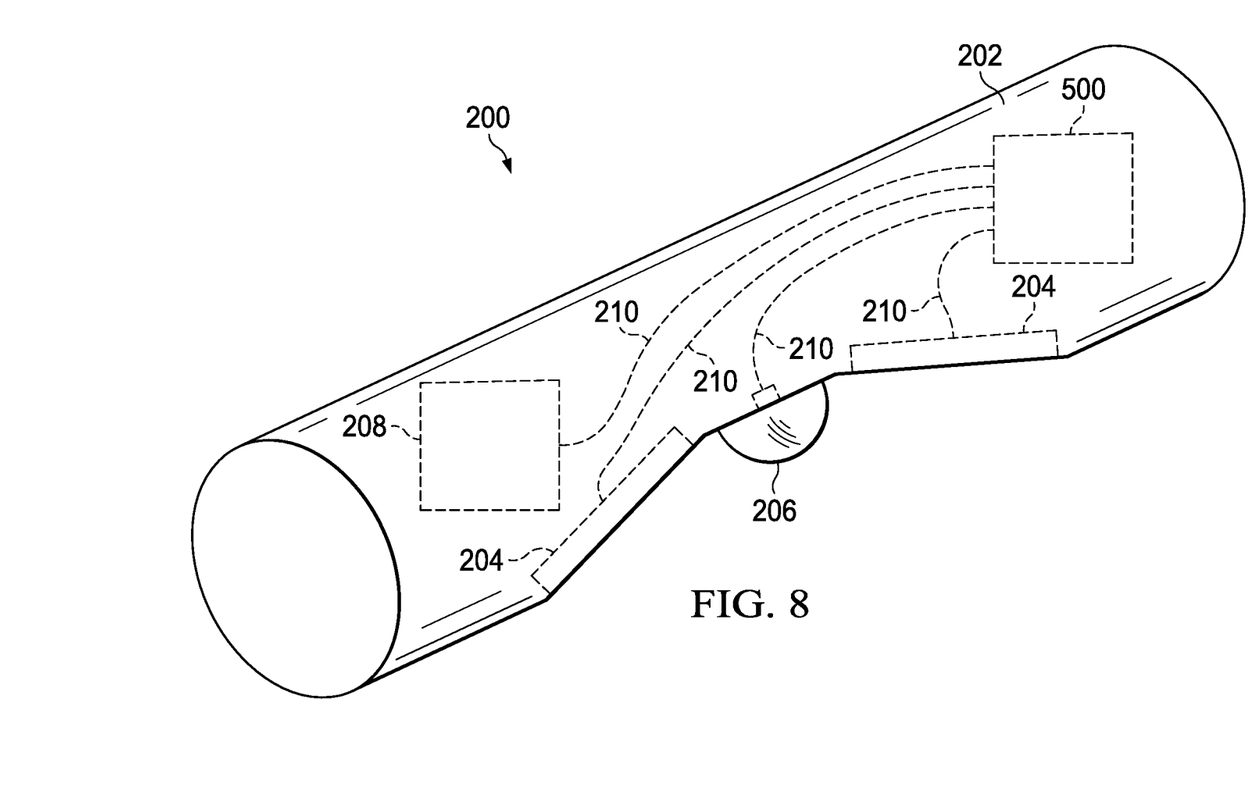
FIG. 8 shows an oblique view of an FDS in isolation.

Referring now to FIG. 8, a failure detection system (FDS) 200 is shown. The FDS 200 comprises a substantially cylindrical body 202 and is configured to house a variety of components within the body 202. In this embodiment, the FDS 200 comprises two light-sensitive charge-coupled device (CCD) camera elements 204 configured to receive light and transmit electrical signals representative of the light received. The FDS 200 also comprises an illumination source 206. In this embodiment, the illumination source 206 comprises a light-emitting diode (LED). Still further, the FDS 200 comprises a power source 208. In this embodiment, the power source 208 comprises a battery. The FDS 200 further comprises a general-purpose processor system 500. Each of the camera elements 204, illumination source 206, and power source 208 are connected to the system 500 using electrical connectors 210 and are controlled by the system 500. It will be appreciated that the body 202 comprises openings and/or windows suitable for allowing the camera elements 204 to receive light. The FDS 200 is configured to selectively utilize electrical power from the power source 208 to emit light from the illumination source 206, receive light with the camera elements 204, and to use the system 500 to transmit information about the received light. While FDS 200 is shown as comprising two camera elements 204, each provided so that outer surfaces 205 of the camera elements 204 are generally angled toward different ends of the body 202, other FDSs may only comprise one camera element 204 or may dispose multiple camera elements 204 differently.

Figure 9:
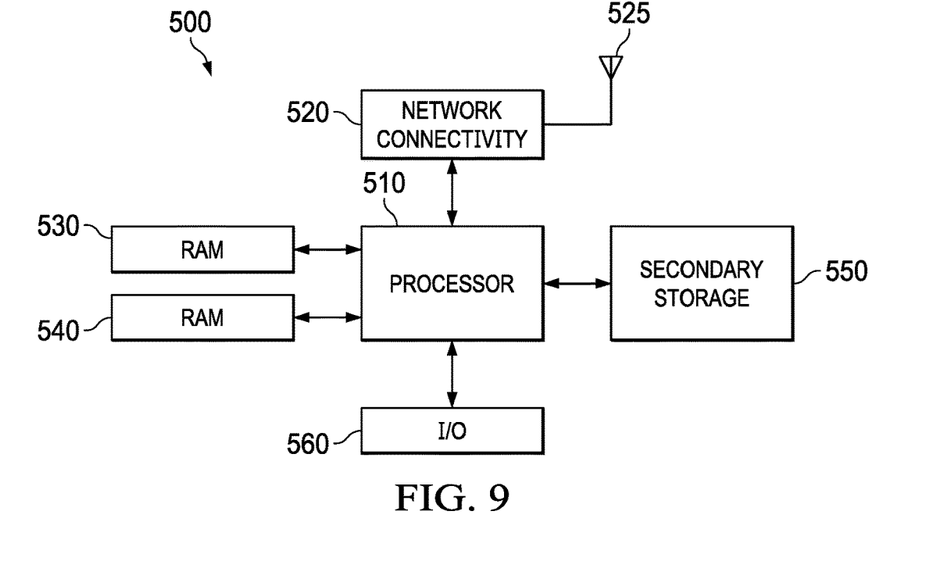
FIG. 9 shows a general-purpose processor system of the FDS of FIG. 8.

Referring now to FIG. 9, a simplified diagram of a general-purpose processor (e.g. electronic controller or computer) system 500 suitable for implementing the embodiments of this disclosure is shown. System 500 that includes a processing component 510 suitable for implementing one or more embodiments disclosed herein. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the system 500. It will be appreciated that the data described herein can be stored in memory and/or in one or more databases.

The processor 510 executes instructions, codes, computer programs, or scripts that it might access from the network connectivity devices 520, RAM 530, ROM 540, or secondary storage 550 (which might include various disk-based systems such as hard disk, floppy disk, optical disk, or other drive). While only one processor 510 is shown, multiple processors may be present. Thus, while instructions may be discussed as being executed by processor 510, the instructions may be executed simultaneously, serially, or otherwise by one or multiple processors 510. The processor 510 may be implemented as one or more CPU chips and/or application specific integrated chips (ASICs).

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information.

The network connectivity devices 520 might also include one or more transceiver components 525 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 525 might include separate receiving and transmitting units or a single transceiver. Information transmitted or received by the transceiver 525 may include data that has been processed by the processor 510 or instructions that are to be executed by processor 510. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs or instructions that are loaded into RAM 530 when such programs are selected for execution or information is needed.

The I/O devices 560 may include liquid crystal displays (LCDs), touchscreen displays, keyboards, keypads, switches, dials, mice, track balls, voice recognizers, card readers, paper tape readers, printers, video monitors, transducers, sensors, or other well-known input or output devices. Also, the transceiver 525 might be considered to be a component of the I/O devices 560 instead of or in addition to being a component of the network connectivity devices 520. Some or all of the I/O devices 560 may be substantially similar to various components disclosed.

As show in FIGS. 4-6, the FDS 200 can be attached to a portion of the post 174 that remains stationary relative to an associated bearing system 181. When properly located, with the outer surfaces 205 generally facing the roller bearings 196, the FDS 200 is oriented in a manner well-suited for receiving light reflected from the bearing system 181. More specifically, the FDS 200 is oriented so that the camera element 204 located furthest away from post 174 is aimed toward and better suited for receiving light reflecting from the inner race surface 183 while the camera element 204 located nearest the post 174 is aimed toward and better suited for receiving light reflected from the outer race surface 186 (the first track 187). While in this embodiment the inner race surface 183 is stationary relative to the FDS 200, thereby preventing the FDS 200 from scanning the entirety of the inner race surface 183, the camera element 204 located furthest from the post 174 can nonetheless capture light reflected from a portion of the inner race surface 183 and the roller bearings 196 as they move relative to the FDS 200. The camera element 204 located nearer the post 174 is more beneficial in the installation shown since it can capture light reflected from not only the roller bearings 196 but also from potentially all of the outer race surface 186. Of course, as the roller bearings 196 pass between the camera element 204 and the outer race surface 186, light reflections from the outer race surface 186 can be obscured or distorted, but with a sufficient number of rotations of the planet gear 172, the camera element 204 is likely to receive light reflected from the entirety of the outer race surface 186 portions that are in line of sight relative to the camera element 204.

Figure 10:
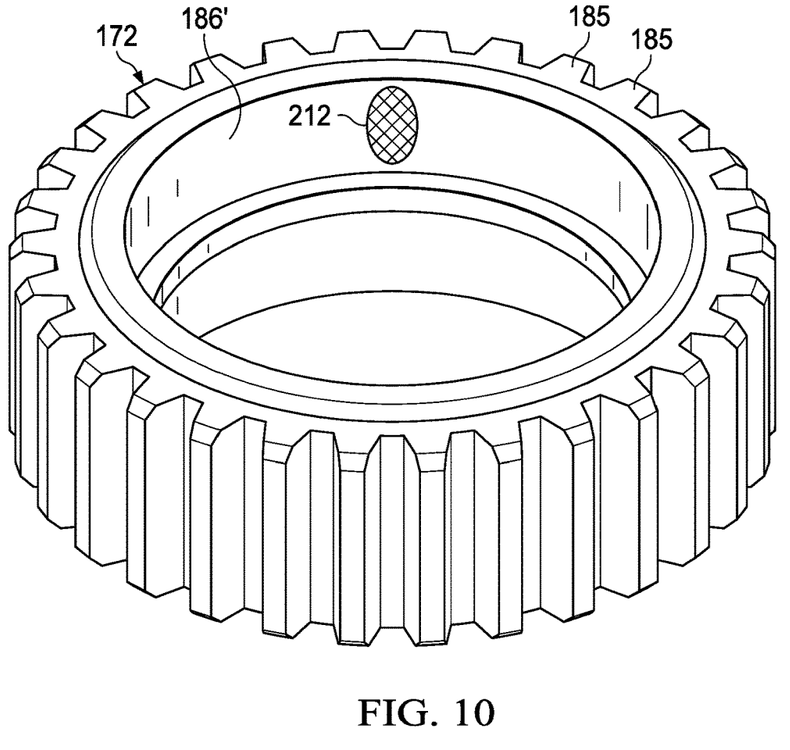
FIG. 10 shows an oblique view of a planetary gear that has a surface anomaly.

Referring now to FIG. 10, a damaged planet gear 172' is shown. The damaged planet gear 172' comprises a damaged outer race surface 186'. In this embodiment, the damage 212 comprises a cracked and/or chipped away portion. When the damaged planet gear 172' is installed within a bearing system 181 as shown in FIG. 6, the damaged outer race surface 186' is able to reflect light to a camera element 204. However, when light is reflected from the damage 212, the light is reflected in a more distributed manner so that the light intensity reaching the camera element 204 is less than when an undamaged portion of the outer race surface 186 reflects light to the camera element 204.

Figure 11:
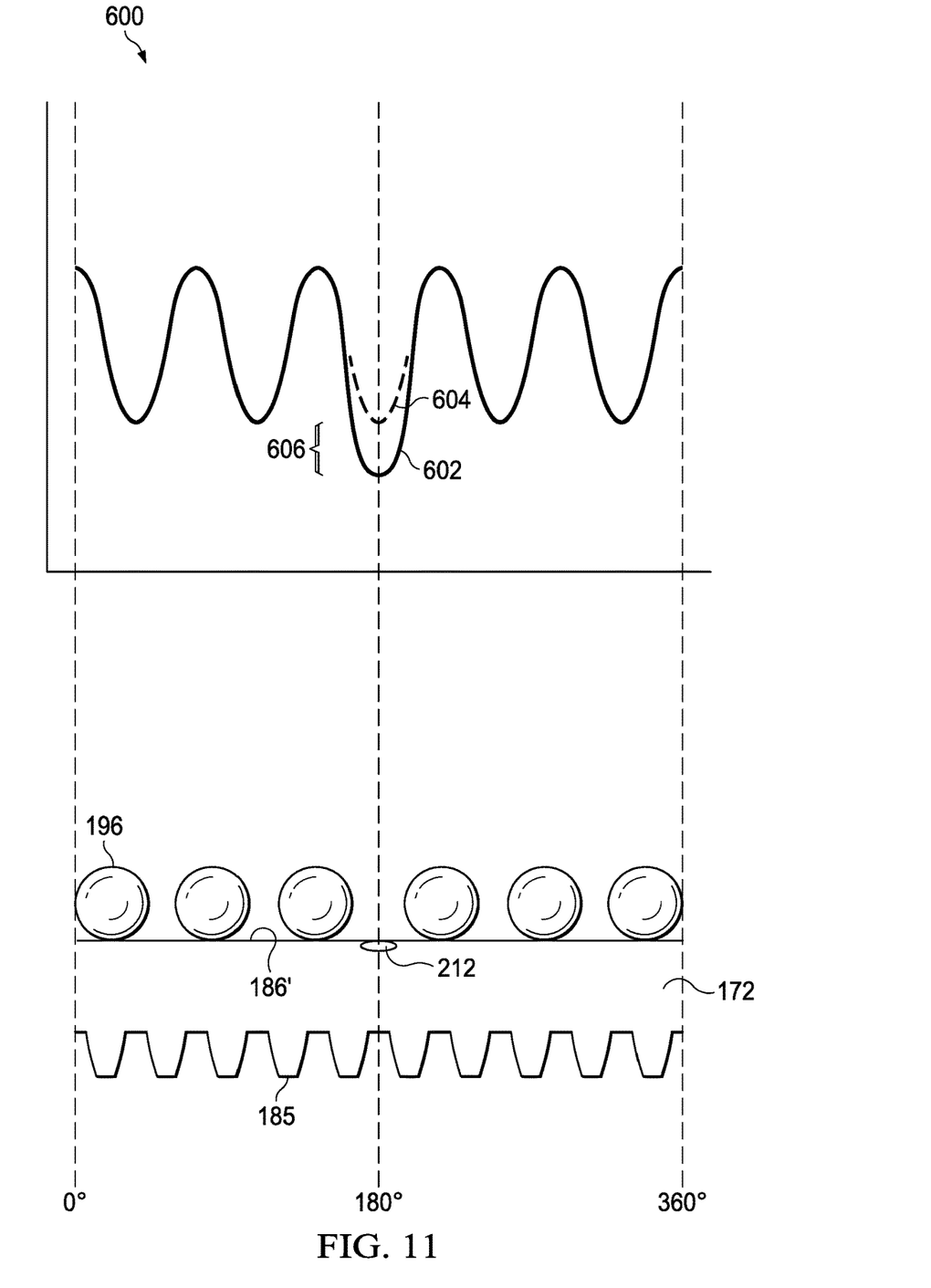
FIG. 11 is a chart showing a curve of light intensity associated with the planetary gear of FIG. 9.

Referring now to FIG. 11, a chart 600 showing two light intensity curves is provided. The light intensity curves are plotted against a projection of an uncurled representation of the planet gear 172'. For ease of explanation, the damage 212 is shown as centered at an angular position of 180 degrees. For purposes of this discussion, it is assumed that when the illumination source 206 is active, an intensity of light received by a camera element 204 increases when a roller bearing 196 is located between the camera element 204 and the outer race surface 186. It is also assumed that when light reflected to the camera element 204 from the damage 212 is relatively less intense than light reflected to the camera element 204 from undamaged portions of the outer race surface 186. Accordingly, if a camera element 204 were to receive reflected light information for the entirety of the outer race surface 186' simultaneously, damaged curve 602 (represented in completely solid line) would result. For comparison, undamaged curve portion 604 (represented in dotted line) would be the result if damage 212 did not exist. In some embodiments, FDS 200 is not required to construct the curves 602, 604 of chart 600, but rather, the FDS 200 can simply monitor for less than usual light reflection. For example, a light intensity differential 606 can be compared to a predetermined differential threshold value so that as the FDS 200 continuously receives reflected light, a visual, audible, or tactile feedback can be generated to indicate that a light reception anomaly has occurred that is approaching, meets, or exceeds the differential threshold value. Such an indication may be utilized to indicate a need to discontinue operation of rotorcraft 100 or to otherwise schedule an inspection and/or maintenance of the bearing system 181.

Figure 12:
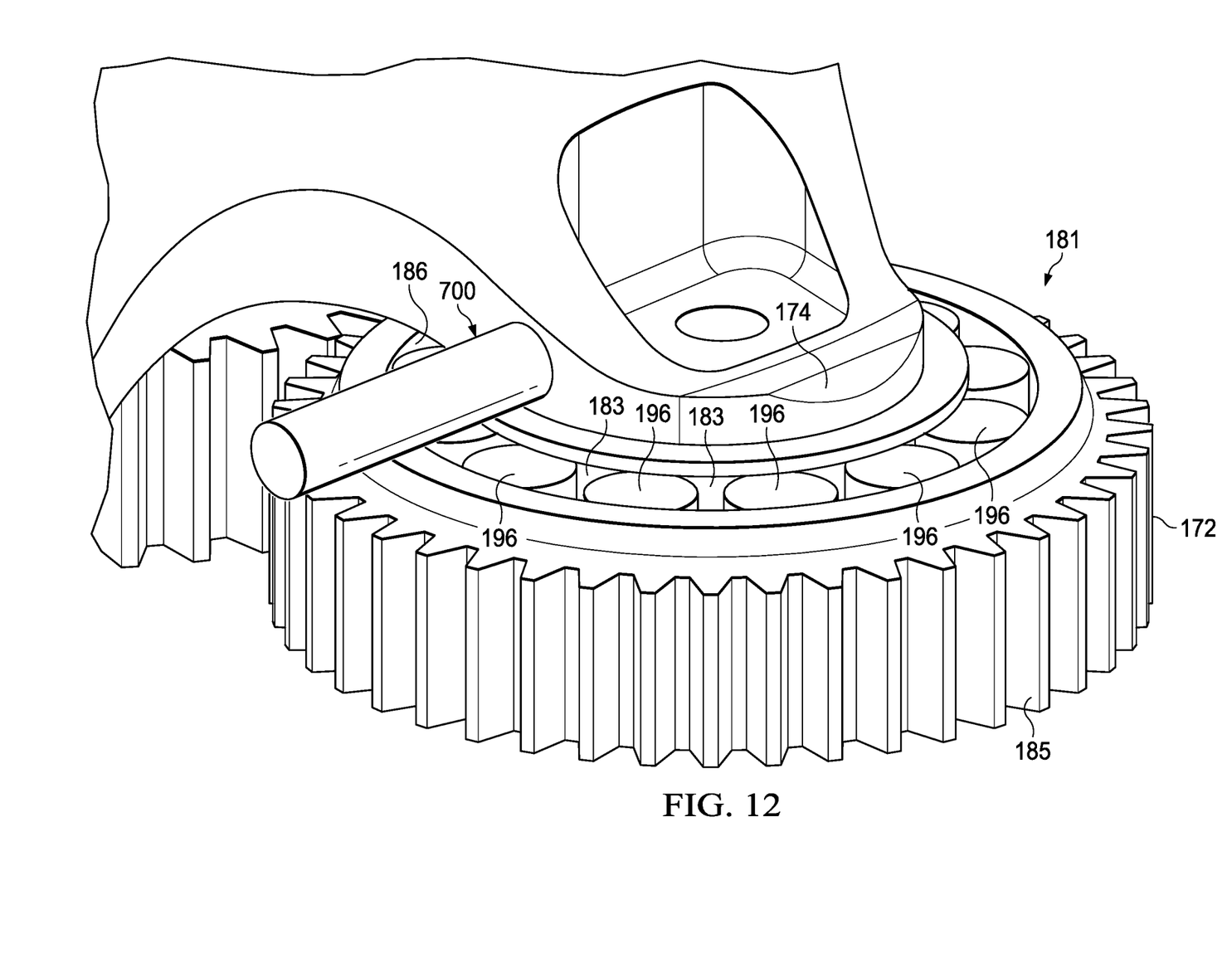
FIG. 12 shows an installation of an alternative embodiment of an FDS.

Referring now to FIG. 12, a failure detection system FDS 700 is shown. The failure detection system 700 is substantially similar to FDS 200, but is configured instead or additionally to monitor for chipping or other damage to gear teeth 185. Accordingly, the FDS 700 is further extended from the post 174 to obtain a better optical line of sight of the gear teeth 185.

Figure 13:
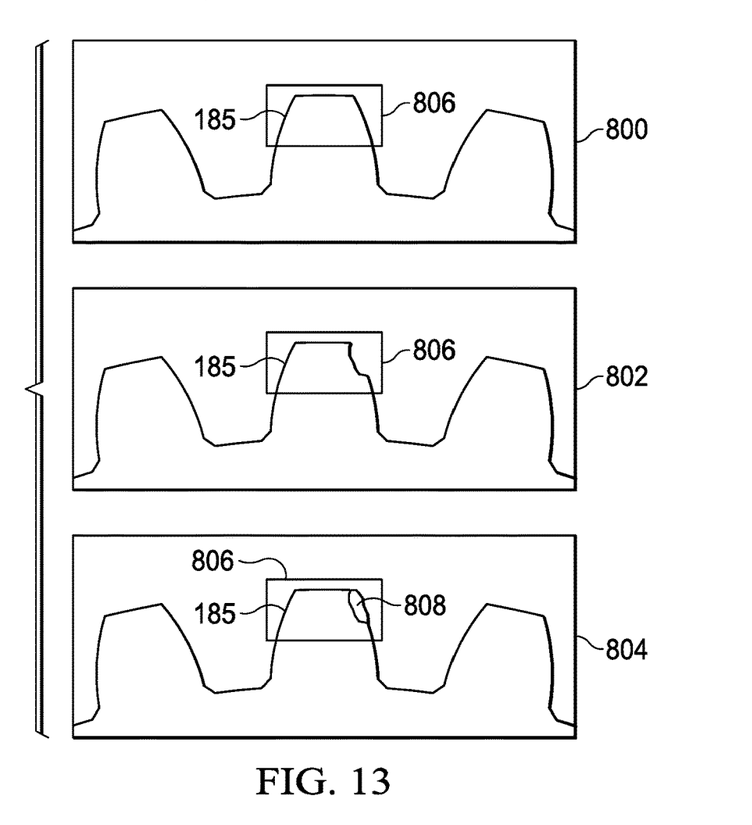
FIG. 13 shows a collection of optical images before and after comparison.

Referring now to FIG. 13, a collection of images of gear teeth 185 are shown. The image 800 comprises an image of a known good health or undamaged gear tooth 185, in some cases, provided to the FDS 700 before operation of the rotorcraft 100. The image 802 is an image taken of a gear tooth 185 that during or after operation of the rotorcraft 100 has become damaged with a portion chipped away. The image 804 comprises a visual representation of how, in some embodiments, the FDS 700 can compare a known good image such as image 800 to a subsequently taken image such as image 802. In some embodiments, the FDS 700 can calculate a percentage optical difference in image field 806 between the content within the image field 806 of image 800 versus the content of the image field 806 of image 804. In some cases, exceeding a threshold percentage difference of image field 806 can trigger one or more of the above described warnings, alerts, and/or actions. Similar image comparison techniques can be used for any other type of component that may be damaged. In this example, the damaged portion 808 is in excess of a threshold amount, so one or more alerts, warnings, and/or actions will be taken in response to the determination that the threshold has been exceeded.

In an alternative embodiment, the general-purpose processor system 500 of FDS 200 may be replaced or supplemented by a field-programmable gate array (FPGA), which is a high-speed logic array, configured to run one or more algorithms for damage detection on the bearing races. In some cases, the FDS 200 is configured to take pictures as opposed to simply receiving and reporting light intensity, and the pictures of the race surfaces can be compared to images known to represent undamaged race surfaces and/or to images known to represent damaged race surfaces. Alternatively, the FDS 200 can simply compare images taken over a period of time for changes in the image content with the assumption that changes represent damage to the race surfaces. In some embodiments, data bearing information about a damaged race surface can be relayed wirelessly to a user or to an aircraft health usage monitoring system (HUMS) of the sort commonly known in the art, for subsequent analysis, triggering alarms, and/or otherwise affecting operation of the rotorcraft 100. The power source 208 can receive energy from a battery (as small as a watch battery or even smaller), a slip ring associated with a shaft, or by energy harvesting from rotary motion. Because the FDS 200 can be supplied in very small form factors, it can be utilized with already existing aircraft bearing designs with no bearing modification required. In some embodiments, the FDS 200 can be disposed within a gearbox housing, such as, but not limited to, gearbox housing 180. The type of advance notice of bearing failure the FDS 200 can offer may allow replacement of the damaged bearing systems as opposed to shipping and installing entire gearbox systems or other systems that comprise damaged bearings.

While the FDS 200 is primarily described above as allowing smart health monitoring of bearings, the same or substantially similar systems can be utilized to optically monitor other machine design components, such as, but not limited to, gears, seals, shafts, and more. In some cases, an entire gearbox could be outfitted with a sufficient number of FDSs 200 to fully monitor each type of machine element and provide real-time failure detection and diagnosis of the system as a whole and each individual monitored component. While such a robust application may not be utilized in the field, a gearbox or transmission may be so fully outfitted when conducting design, development, and/or testing of the large systems. While the FDSs 200 are shown as being adhered to the posts 174, FDSs 200 can alternatively be fastened or otherwise integrated with posts 174 or any other suitable support structure.

Figure 14:
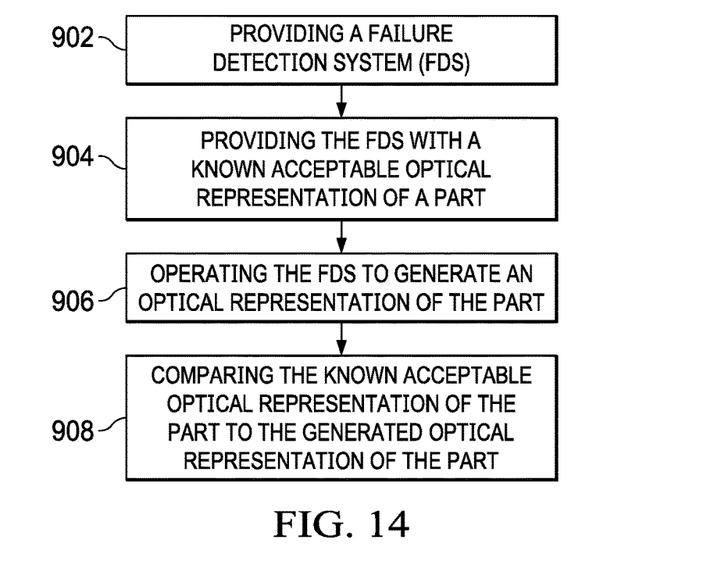
FIG. 14 is a flowchart of a method of detecting part failure.

Referring now to FIG. 14, a method 900 of detecting failure of a part is shown. The method 900 can begin at block 902 by providing a FDS, such as, but not limited to, FDS 200, 700. The method 900 can progress at block 904 by providing the FDS with a known acceptable optical representation of a part. In some cases, the known acceptable optical representation can be an image (such as a photograph generated by a camera element 204). In other cases, the known acceptable optical representation can comprise a light intensity curve. The method 900 can progress at block 906 by operating the FDS to generate an optical representation of the part. The method 900 can progress at block 908 by comparing the known acceptable optical representation of the part to the generated optical representation of the part. In some cases, if there exists more than a predetermined threshold amount of difference, an alert, warning, and/or any other suitable action can be taken in response to the threshold amount of difference being met or exceeded.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A transmission, comprising:
   a gearbox;
   a gear disposed within the gearbox, the gear comprising gear teeth;
   an inner race of a bearing associated with the gear, the inner race being disposed radially inward relative to the gear teeth and the inner race longitudinally overlapping the gear teeth;
   an outer race of the bearing associated with the gear, the outer race being disposed radially inward relative to the gear teeth and the outer race longitudinally overlapping the gear teeth;
   a camera element disposed within the gearbox; and a processor disposed within the gearbox;
   wherein the camera element is located and oriented to receive light reflected from a part of the gearbox and wherein the part comprises at least one of an inner race of a bearing of the gearbox and an outer race of the bearing of the gearbox.

2. The transmission of claim 1, further comprising at least one of a power source disposed within the gearbox and a processor disposed within the gearbox.

3. The transmission of claim 2, wherein the processor comprises a field-programmable gate array.

4. The transmission of claim 1, wherein the camera element comprises a charge-coupled device.

5. The transmission of claim 1, further comprising:
   an illumination source disposed within the gearbox.

6. The transmission of claim 1, wherein the processor comprises a general-purpose processor system.

7. The transmission of claim 1, wherein the camera element is attached to a planetary carrier of the transmission.

8. The transmission of claim 1, wherein the processor is configured to compare at least two optical representations of the part.

9. The transmission of claim 1, wherein the processor is configured to wirelessly communicate information regarding an optical representation of the part.

10. The transmission of claim 1, wherein the processor is configured to communicate information regarding a comparison of optical representations of the part.

11. A method of detecting failure of a part of a transmission, comprising:
    disposing at least a portion of a failure detection system (FDS) within a gearbox of the transmission; and
    providing the FDS with a known acceptable optical representation of the part of the gearbox;
    wherein the part of the gearbox is a bearing and the optical representation is at least one of an optical representation of an inner race of the bearing and an optical representation of an outer race of the bearing; and
    wherein both the inner race of the bearing and the outer race of the bearing are disposed radially inward relative to gear teeth of a gear within the gearbox; and
    wherein both the inner race of the bearing and the outer race of the bearing longitudinally overlap the gear teeth of the gear.

12. The method of claim 11, further comprising:
    operating the FDS to generate an optical representation of the part.

13. The method of claim 12, further comprising:
    operating the FDS to compare the known acceptable optical representation to the generated optical representation.

14. The method of claim 13, wherein an action is taken in response to a result of the comparison.

15. The method of claim 14, wherein an action is taken in response to the comparison resulting in a threshold difference being met or exceeded.

16. The method of claim 11, wherein the known acceptable optical representation of the part comprises a light intensity.

17. The method of claim 11, wherein the known acceptable optical representation of the part comprises a light intensity curve.

18. The method of claim 11, wherein the known acceptable optical representation of the part comprises an image.

19. A transmission, comprising:
    a gearbox;
    a planetary gear system disposed within the gearbox, the planetary gear system comprising a planet carrier and a planet gear carried by the planet carrier, the planet carrier comprising a post carrying an inner race and the planet gear comprising an outer race formed radially inward relative to both gear teeth and a rim of the planet gear;

a plurality of roller elements disposed between the inner race and the outer race for allowing rotation of the planet gear relative to the post; and a failure detection system (FDS) comprising a camera element disposed within the gearbox;

wherein the camera element is configured to at least one of (1) take a picture of at least one of the inner race and the outer race and (2) measure an intensity of light reflected from at least one of the inner race and the outer race.

20. The transmission of claim 19, wherein at least a portion of the FDS is carried by the planet carrier and is disposed longitudinally offset from at least one of the inner race and the outer race and radially overlapping the planet gear.

* * * * *